United States Patent

[11] 3,580,372

[72] Inventors Paul J. Schiefer
Sherman Oaks;
James D. McFarland, Jr., Chatsworth, Calif.
[21] Appl. No. 827,691
[22] Filed May 26, 1969
[45] Patented May 25, 1971
[73] Assignee Schiefer Manufacturing Company
Monterey Park, Calif.

[54] CLUTCH WITH ADJUSTABLE CENTRIFUGAL PRESSURE ASSIST LEVERS
9 Claims, 2 Drawing Figs.

[52] U.S. Cl. .................................................. 192/105,
151/33, 192/99
[51] Int. Cl. ............................................... F16d 43/06
[50] Field of Search ............................................ 192/105
(C), 99 (A)

[56] References Cited
UNITED STATES PATENTS
| | | | |
|---|---|---|---|
| 2,021,973 | 11/1935 | Wemp | 192/99AX |
| 2,406,244 | 8/1946 | Nutt | 192/105CX |
| 2,583,621 | 1/1952 | Zeidler | 192/105CX |
| 2,657,781 | 11/1953 | Zeidler | 192/105CX |

*Primary Examiner*—Benjamin W. Wyche
*Attorney*—Christie, Parker & Hale

ABSTRACT: A centrifugal pressure assist type clutch utilizes the constant force of compression springs and a variable dynamic force to load a pressure plate against a driven disc. The clutch is adjustable to vary the dynamic loading of the pressure plate on the driven disc and therefor the engagement force of the clutch with a flywheel. The clutch has a plurality of radially disposed release fingers pivotally secured to a clutch cover in a common plane normal to the axis of rotation of the clutch. The fingers are also pivotally secured to the pressure plate. Each finger has a lever portion which extends radially inward from the finger's pivotal connection to the clutch cover for selective engagement by a clutch release bearing. Each finger also has a centrifugal weight to create a moment which is a function of the rotational speed of the finger that tends to pivot the finger about the pivotal connection to the clutch cover and force the pressure plate against the driven disc. The adjustment of the dynamic loading is effected through movement of the position of the fingers' pivot axes on the clutch cover relative to the finger pivot points on the pressure plate and therefore the moment of the fingers at a given rotational speed.

CLUTCH WITH ADJUSTABLE CENTRIFUGAL PRESSURE ASSIST LEVERS

BACKGROUND OF THE INVENTION

The present invention relates to clutches in general and, more specifically, to a centrifugal pressure assist type clutch having means for adjusting the amount of the clutch's centrifugal loading.

Especially in competitive applications, a tremendous amount of power must be transmitted through a clutch to a vehicle's drive train. The transfer of power from a vehicle's engine to the drive train must be done rapidly. This occasions severe loading of drive train components because of the inertia of the components. Drive train loading has become particularly acute with the use of large, massive tires. To "cushion" this dynamic shock, recent clutch technology has evolved a controlled slip-type clutch. A slip-type clutch enables a more gradual rate of change of power input to a vehicle's drive train to avoid excessive dynamic loading of its components. A slip-type clutch also has had a tendency to reduce wheel spin with the result that more power is effectively used in accelerating a vehicle.

But a controlled slip clutch, while reducing the rate of change of power transfer from an engine to a drive train, must terminate its slip at some point. This is necessary to avoid power loss and excessive clutch wear. It has been found that a centrifugal-type clutch, which utilizes centrifugal force to dynamically load a clutch's pressure plate against its driven disc and flywheel with a force increasing with the revolution rate of the clutch, provides an excellent vehicle for controlled slip. With this type of clutch, normal spring loading of the pressure plate is retained. Thus at low clutch revolution rates the springs provide the majority of "clutch lockup" but have insufficient force to prevent the clutch from slipping. Therefore at low clutch revolution rates, the dynamic shock on a drive train and wheel slippage are considerably reduced. But at higher clutch revolution rates, the centrifugal or dynamic loading of the pressure plate considerably augments spring loading to prevent slippage.

A problem with existing centrifugal pressure assist type clutches is that there is no way to vary the amount of dynamic loading. Thus at higher and higher revolution rates the clutch may become increasingly difficult to disengage because centrifugal loading becomes very high. While this high loading may be desirable in some applications, it may not be desirable or necessary in others. When it is not necessary, it would be desirable to avoid difficult clutch disengagement. Therefore there is a present requirement for a centrifugal pressure assist type clutch which may be adjustable to vary the amount of centrifugal assist the clutch affords.

Another problem with existing centrifugal-type clutches is that there is no means to readily adjust for wear of their wearing surfaces. Wear is an acute problem because it affects the amount of loading. With worn wear surfaces, for example, the load at a given revolution rate of a clutch is reduced because the dynamic load on the pressure plate is lower. It is therefore desirable to provide some means to account for pressure plate and clutch disc wear.

It is also highly desirable to provide a means for controlling the rate at which a clutch will "lock up" in order to control the rate at which power is actually transferred to the drive train of a vehicle. This is desirable because different applications, different power plants, and different vehicles require their own compensation to optimize clutch performance.

SUMMARY OF THE INVENTION

The present invention provides a centrifugal pressure assist type clutch which is adjustable to vary the amount of centrifugal or dynamic loading of the clutch's pressure plate on a driven disc and therefore the force of engagement of the clutch on a flywheel.

In one form the present invention contemplates a centrifugal pressure assist type clutch in which the position of a plurality of centrifugal weighted release fingers can be varied relative to a plane in which they would rotate but for restraining forces exerted by the pressure plate. With a change in the position of the release fingers, a change in the dynamic loading on the pressure plate is effected. The centrifugal weighted release fingers are pivotally secured to a clutch cover and the pressure plate. Each release finger has a lever portion which extends radially inward from the finger's pivotal connection to the clutch cover for engagement by a clutch-release bearing. The pressure plate is disposed for pressure engagement with a clutch disc assembly to force the clutch disc assembly tightly against a flywheel assembly in response to dynamic and static loading of the pressure plate. The static loading of the pressure plate is provided by a plurality of springs disposed between the pressure plate and the clutch cover. The dynamic loading, as previously mentioned, is provided by the centrifugally weighted fingers forcing the pressure plate into tighter and tighter engagement with the clutch disc assembly as the revolution rate of the clutch increases.

The dynamic loading of the pressure plate is effected through the tendency of the fingers to pivot about their pivot axes in response to centrifugal force. As is well known, centrifugal force of a rotating object is a function of the weight of the object and its radial position from the object's axis of rotation. At a given rotational speed, the centrifugal force of an object is directly proportional to its rotational moment of inertia which in turn is proportional to the square of the distance of the object from the axis of rotation. Because the centrifugal weights of the finger are relatively massive and are furthest from the clutch's axis of rotation, their position dominates the centrifugal response of the fingers. As such, the weights are positioned to tend to move axially towards the pressure plate with rotation of the clutch. But the pressure plate itself exerts a moment on the fingers which prevents them from reaching the axial rotational position they would have if their position was solely a function of the moment of the centrifugal weights.

In specific form, the variation of position of the centrifugal weights relative to the pressure plate is effected through axial movement of the pivotal connections of the fingers to the clutch cover. This is preferably done by a yoke pivotally connected to each finger at the finger's pivot axis and rotatably secured to a threaded bushing as by a male fastener. Each threaded bushing in turn is threaded in the clutch cover. The threaded bushing preferably has wrenching flats for accepting a wrenching tool. Rotation of the threaded bushing by the wrenching tool causes the pivot axes of the fingers on the clutch cover to move axially with the result that the axial position of the centrifugal weights relative to the pressure plate is varied.

It is preferred to have but two diametrically opposed wrenching flats on the threaded bushing. This is preferred because it provides an easy way to index each finger relative to the others by simply observing the position of the wrenching flats.

The centrifugal pressure assist type clutch of the present invention provides a convenient and expeditious way to adjust its centrifugal loading. With the ability to adjust the amount of centrifugal loading of the clutch, the clutch can be adjusted to suit the particular conditions under which it is to run. Thus, in some applications, it may be desired to effect a substantial amount of centrifugal loading. This may be done by adjusting the position of the centrifugal weights such that they are further removed from the pressure plate. On the other hand, it may be desirable to have the clutch release easier. This can be done simply by adjusting the position of the centrifugal weights closer to the pressure plate. Moreover, the position of the centrifugal weights can be adjusted to compensate for wear of the surfaces of the clutch disc and pressure plate, and the rate at which the clutch will "lock up" to accommodate different operating conditions.

In competitive events in particular, wear of the wear surfaces becomes so severe that dynamic loading cannot lock the clutch. As a result, slip continues to the point that the heat generated destroys the clutch, often with catastrophic results. Disintegration of the clutch is not uncommon under these circumstances. With the clutch of the present invention, adjustments can be made to optimize slip and wear to avoid catastrophic failure.

These and other features, aspects and advantages of the present invention will become more apparent from the following description, appended claims and drawings.

BRIEF DESCRIPTION OF THE FIGS.

FIG. 1 is a plan view, partly broken away, of a preferred embodiment of the present invention; and FIG. 2 is a view taken along line 2-2 of FIG. 1 and also partly broken away.

DESCRIPTION OF THE PREFERRED EMBODIMENT

Figure 1:
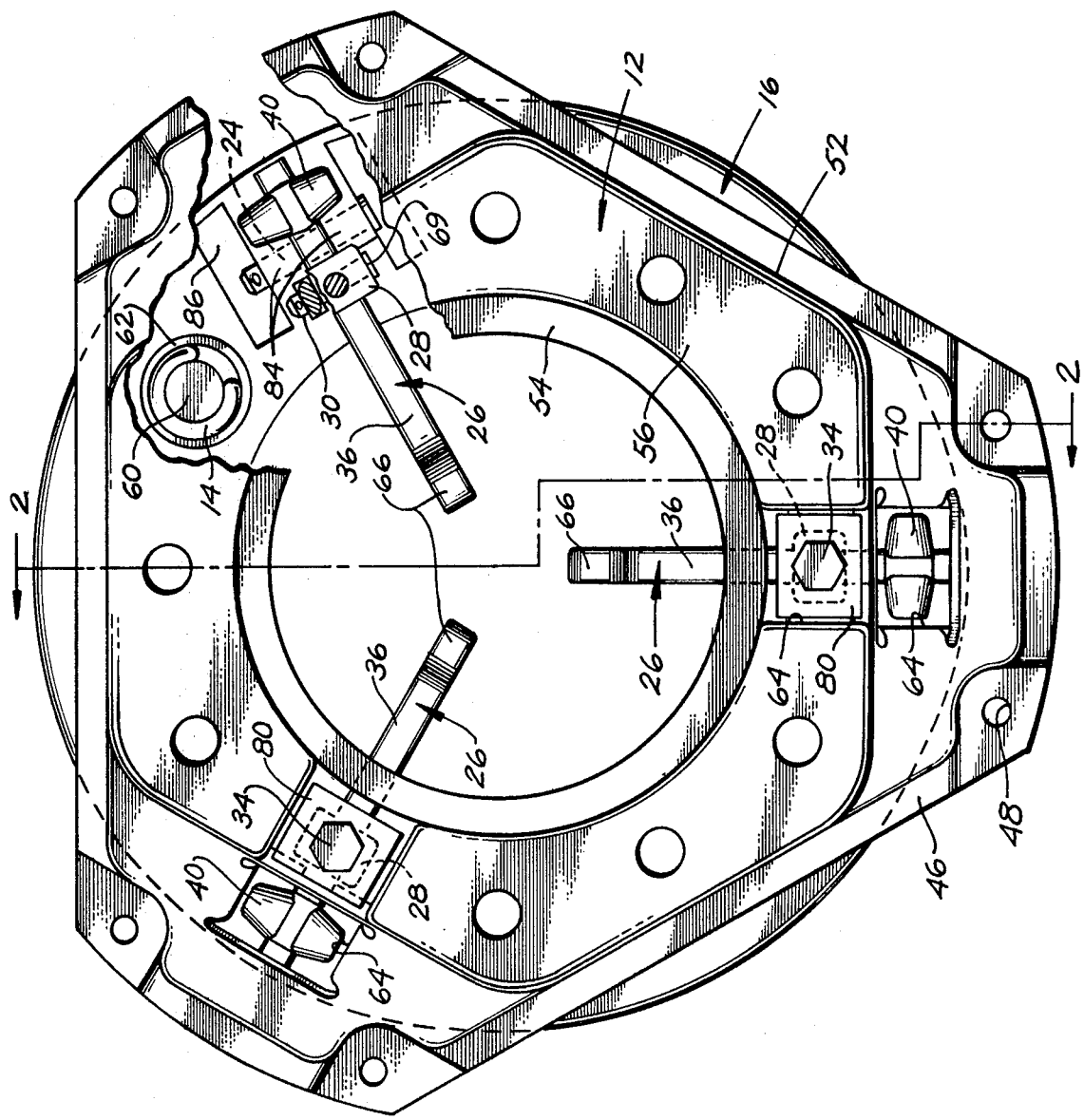

The FIGS. illustrate a preferred embodiment of the centrifugal pressure assist type clutch of the present invention. The matter depicted in phantom is so depicted because it is of standard design. It is depicted to illustrate the clutch's environment.

A clutch cover 12 mounts a plurality, say, nine compressor springs 14. These springs urge against a pressure plate 16. The pressure plate is annularly disposed about the axis of rotation of the clutch. The pressure plate is capable of engaging a clutch disc assembly 20. A flywheel assembly 22 is engageable by the clutch disc assembly. The pressure plate is pivotally secured through a plurality of pins 24 to a corresponding number of release fingers 26. The release fingers in turn are pivotally secured to the clutch cover. Each of the release fingers is secured to the clutch cover through a yoke 28, pin 30 and an adjustable threaded bushing 32. The threads of the bushings are indicated by reference numeral 33. The threaded bushing is secured to the yoke through a male fastener 34. Each finger has a lever portion 36 for engagement with a clutch release bearing 38 and a counterweight or bobweight portion 40. The release bearing is carried by an input shaft 37 of a transmission 41. Bobweight or centrifugal weight 40 is disposed axially from a plane normal to the axis of rotation of the clutch and containing pivot point 30 of each finger. Input shaft 37 also carries clutch disc assembly 20 and permits this assembly to move axially. Splines on the input shaft rotatably secure the clutch disc assembly to the shaft.

Figure 2:
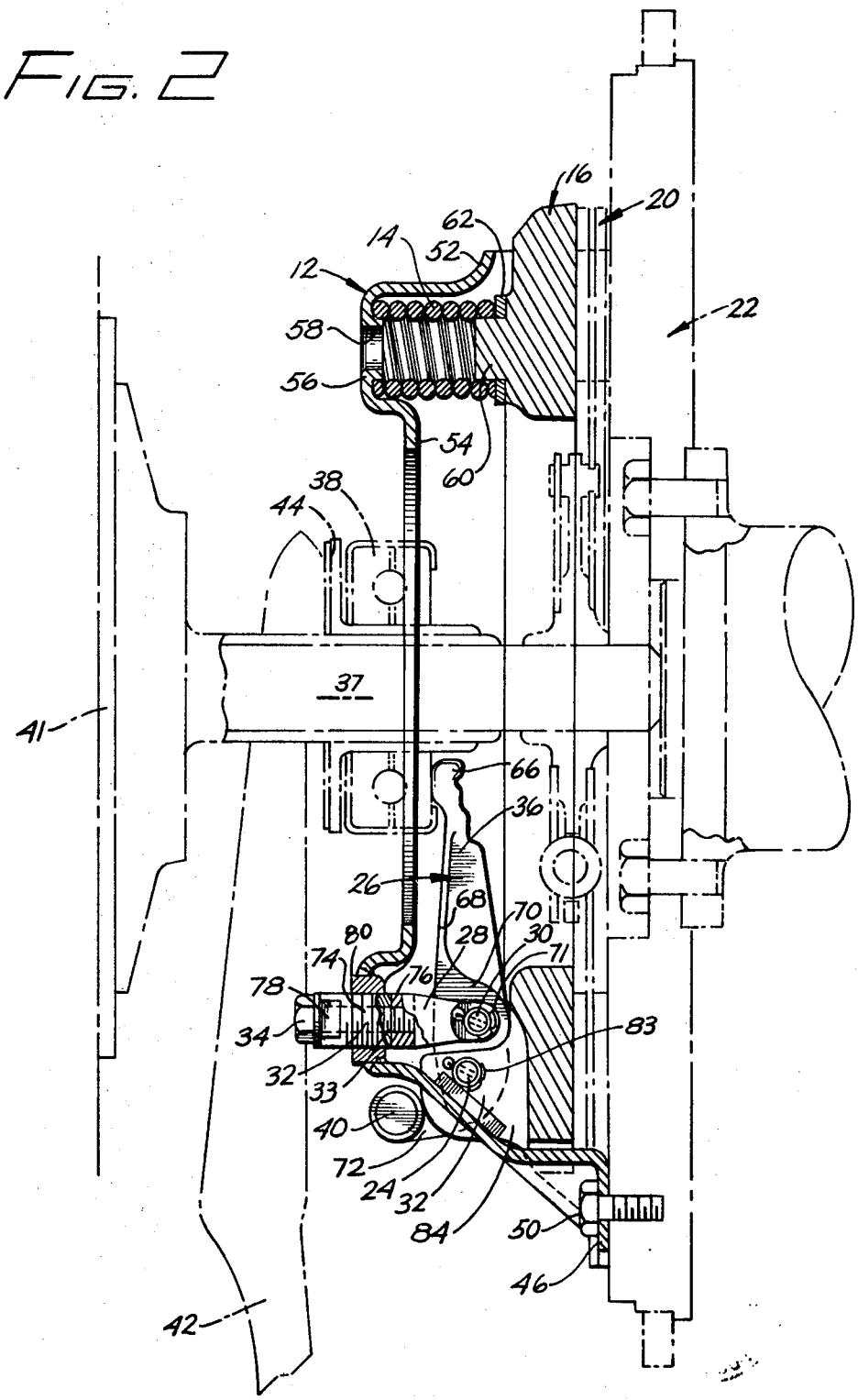

In general, the clutch is disengaged by pressure applied through a release lever 42 on a release bearing hub 44 and in turn release bearing 38 to force the bearing axially towards flywheel assembly 22 on shaft 37. With this motion, release fingers 26 rotate clockwise in FIG. 2 to move pressure plate 16 axially away from clutch disc assembly 20. When engaged, compression springs 14 urge pressure plate 16 tightly against clutch disc assembly 20. Clutch disc assembly 20 in turn is urged against flywheel assembly 22. With increasing angular velocity of the clutch assembly, centrifugal weights 40 tend to move outward and towards the flywheel assembly to pivot release fingers 26 about the pivot axes defined by the axes of pins 30. With this movement of the centrifugal weights, a dynamic load on pressure plate 16 is created which in turn passes the load through the clutch disc assembly to the flywheel assembly.

At a given revolution rate the amount of dynamic loading of the pressure plate by the centrifugal weights may be adjusted by varying the position of the pivot axes defined by pins 30. This is done by threading bushings 32 in a direction which moves the pivot axes towards or away from the flywheel assembly.

With this brief description of the operation of the centrifugal pressure assist type clutch in mind, a more detailed description will be presented.

Clutch cover 12 includes a mounting flange 46 which circumscribes the clutch cover and provides a plurality of fastener holes 48. Male fasteners 50 are used to secure the clutch cover securely to flywheel assembly 22. The clutch cover has a raised portion 52 which extends axially away from flywheel assembly 22. The raised portion houses compression springs 14, pressure plate 16 and clutch disc assembly 20. A radial inward terminus of raised portion 52 is determined by circumferential flange 54. This flange is located axially towards the flywheel assembly from a raised annulus 56. At regular intervals around raised annulus 56, inwardly turned flanges 58 are present to act as mounting bosses for compression springs 14. Axially aligned with each of these mounting bosses is a cooperating mounting boss 60 on the pressure plate. The compression springs, then, fit over the mounting bosses of the pressure plate and the clutch cover and act against the pressure plate to urge it against clutch disc assembly 20. A washer 62 of heat resistant material is disposed between each of the springs and the pressure plate to shield the springs from the heat generated during clutching and declutching.

The clutch cover also has a plurality of windows 64 for each of the centrifugal weights 40 of the release fingers 26.

Each of the release fingers includes lever portion 36 which extends radially inward from pivot pins 30 for engagement by release bearing 38. Each lever has a follower portion 66 displaced axially from the balance of the lever for actual contact with the release bearing. Each reinforcing rib 68 extends radially along the lever portion and merges into a boss portion 70 which receives the pivot pin for the particular finger. A centrifugal weight 40 is disposed at the end of an arcuate-shaped extension 72 of each finger. Each weight extends transversely to the longitudinal axis of its release finger and concentrates most of the finger's mass. As was previously mentioned, the weight is displaced axially away from the flywheel assembly and the point of pivotal connection of each of the release fingers to the clutch cover.

The fingers are, as was previously mentioned, pivotally secured to clutch cover 12. In greater detail, this is accomplished for each finger by yoke 28 which straddles the finger's boss portion 70 and carries threaded bushing 32 and pivot pin 30. The pivot pin pivotally carries the release finger and is secured therein by a head 69 of the pin and a carter key 71. Each yoke is secured through a complementary one of the threaded bushings 32 by one of the male fasteners 34 to the clutch cover. Each male fastener passes through a bore 74 in the threaded bushing for threaded receipt in a web 76 of the yoke.

Each of the threaded bushings has cooperating wrenching flats 78. These wrenching flats are disposed on diametrically opposite sides of the bushing and there are only two of them. The provision of only two wrenching flats provides a convenient vehicle to ensure proper indexing of each of the release fingers relative to the other release fingers and therefore to ensure an even loading of pressure plate 16 on clutch disc assembly 20.

A reinforcing plate 80 is secured to the clutch cover and has threads complementing the male threads on the threaded bushing 32.

Each of the fingers 26 is also pivotally connected to pressure plate 16 through one of the pins 24. Each of these pins passes through a shank 82 of the finger and a yoke 84 of the pressure plate and is secured by a pinhead 81 and a carter key 83. Yoke 84 of the pressure plate extends axially away from the flywheel assembly for this purpose. A recess 86 in the pressure plate defines each of the yokes 84.

Each of the pins 24 of each of the fingers is radially further from the axis of rotation of the clutch assembly than its cooperating pin 30. This enables the centrifugal effect of weights 40 to create a moment through pins 24 on the pressure plate. This moment is resisted by the moment of the pressure plate on pins 24 and therefore fingers 26 can never reach their "free rotation" position.

In operation, then, when the clutch is engaged but not rotating, pressure plate 16 is urged against clutch disc assembly 20 which in turn is urged against flywheel assembly 22 by the plurality of compression springs 14. Centrifugal weights 40 do not contribute any loading of the clutch disc assembly at all until the clutch begins to rotate. As the rotational speed of the clutch assembly increases, the centrifugal weights centrifugally load the release fingers to a greater and greater extent. This load is radially outward of the rotational axis of the clutch assembly. But the centrifugal weights are offset from the plane in which the fingers would rotate without the moment exerted by pressure plate through pins 24 on the fingers. Therefore, there will be a moment tending to rotate the fingers in a direction towards the flywheel assembly. This moment produces an axial component of force on the pressure plate which dynamically urges the pressure plate into tighter and tighter engagement with the clutch disc assembly. It is readily seen, then, that at a given revolution rate and a given position of the weights, a given amount of dynamic loading will result. If this loading is too great, then threaded bushing 32 is threaded outwardly from flywheel assembly 22 to rotate weight 40 closer to the flywheel assembly. This produces a lower moment at the given revolution rate and therefore a smaller amount of dynamic loading of the clutch disc assembly. Conversely, when it is desired to produce an increased dynamic load at a given revolution rate of the clutch assembly, the threaded bushing is screwed inwardly towards the flywheel assembly to position the centrifugal weights further from the flywheel assembly and generate an increased moment. The increased moment will produce an increase in the dynamic loading of the clutch disc assembly.

At a given revolution rate, then, and with the clutch engaged, compressor springs 14 and the centrifugal or dynamic loading produced by the centrifugal weights cooperate to urge the clutch disc assembly tightly against the flywheel assembly and to rotate main input shaft 37 of the transmission. When it is time to release the clutch, release lever 42 is actuated to thrust release bearing 38 against lever portions 36 of fingers 26 to pull the pressure plate assembly axially from the flywheel assembly. The amount of force which must be overcome by the release lever, of course, is determined by the dynamic loading produced by the centrifugal weights at the revolution rate of disengagement. As was previously mentioned, this can be adjusted to fit a greater or lesser amount of loading. It is also clear that adjustment of the dynamic loading of the clutch disc assembly can compensate for wear and determine the rate at which a clutch will "lock up."

I claim:

1. In a centrifugal pressure assist type clutch, an improvement comprising:
   a. a clutch cover;
   b. a pressure plate adapted to engage and force a clutch disc into engagement with a flywheel;
   c. spring means between the pressure plate and the clutch cover for urging the pressure plate into engagement with the clutch disc;
   d. a plurality of release fingers disposed in a radial array at equal angles from each other around the axis of rotation of the clutch, each finger being mounted to the clutch cover for pivotal movement about a pivot axis located in a plane normal to the axis of rotation and tangent to a circle in the plane, each finger including:
      i. a lever portion extending radially inward from the finger's pivot axis for engagement by a clutch release bearing; and
      ii. a centrifugal weight extending radially away from the finger's pivot axis and offset axially away from the pressure plate and the plane containing the pivot axis such that with rotation of the clutch about its rotational axis the centrifugal weight tends towards the pressure plate;
   e. means for pivotally mounting each finger to the pressure plate such that pivotal movement of the fingers about their pivot axes in response to movement of the centrifugal weights towards the pressure plate causes a dynamic axial load to be exerted on the pressure plate which urges the pressure plate against the clutch disc; and
   f. means for adjusting the axial position of each of the release finger's pivot axis to vary the dynamic loading of the pressure plate by varying the axial position of the centrifugal weights relative to the pressure plate; the adjusting means including
      i. a yoke spanning each finger and pivotally secured thereto;
      ii. a bushing rotatably secured to each yoke; and
      iii. means for securing each bushing to the clutch cover such that the axial position of the bushing with respect to the pressure plate can be varied.

2. The improvement claimed in claim 1 wherein:
the securing means includes threads on each bushing threadably engaged in complementary threads in the clutch cover, each bushing having a pair of diametrically apposed wrenching flats for adjusting its axial position.

3. The improvement claimed in claim 2 wherein:
a female threaded reinforcing plate is provided in the clutch cover for each bushing, each bushing being threaded into a complementary reinforcing plate.

4. The improvement claimed in claim 1 wherein:
   a. the pivotal mounting of each finger to the clutch cover is radially inward of the pivotal mounting of each finger to the pressure plate; and
   b. the pivotal mounting of each finger to the clutch cover and the pressure plate is intermediate the pressure plate and the centrifugal weight.

5. The improvement claimed in claim 4 wherein:
   a. each yoke spans its associated finger and is pivotally secured thereto at the legs of the yoke; and
   b. the securing means includes thread means on each bushing and the clutch cover to permit selective rotation of the bushings in the clutch cover to adjust the axial position of the fingers' pivot axes.

6. The improvement claimed in claim 5 wherein:
each bushing has a pair of diametrically opposed wrenching flats for adjusting its axial position and the finger pivot axis associated with the particular bushing.

7. In a centrifugal pressure assist type clutch, an improvement comprising:
   a. a clutch cover;
   b. a pressure plate adapted to engage and force a clutch disc into engagement with a flywheel;
   c. spring means between the pressure plate and the clutch cover for urging the pressure plate into engagement with the clutch disc;
   d. a plurality of release fingers disposed in a radial array at equal angles from each other around the axis of rotation of the clutch, each finger being mounted to the clutch cover for pivotal movement about a pivot axis located in a plane normal to the axis of rotation and tangent to a circle in the plane, each finger including:
      i. a lever portion extending radially inward from the finger's pivot axis for engagement by a clutch-release bearing; and
      ii. a centrifugal weight extending radially away from the finger's pivot axis and offset axially away from the pressure plate and the plane containing the pivot axis such that with rotation of the clutch about its rotational axis the centrifugal weight tends towards the pressure plate;
   e. means for pivotally mounting each finger to the pressure plate such that pivotal movement of the fingers about their pivot axes in response to movement of the centrifugal weights towards the pressure plate causes a dynamic axial load to be exerted on the pressure plate which urges the pressure plate against the clutch disc; and
   f. means for adjusting the axial position of each of the release finger's pivot axis to vary the dynamic loading of the pressure plate by varying the axial position of the centrifugal weights relative to the pressure plate, the adjusting means including a bushing for each of the fingers threadably received in the clutch cover and means between each bushing and the fingers' pivot axes coupling the bushing to the fingers.

8. The improvement claimed in claim 7 wherein the coupling means for each finger includes a yoke and a pivot pin, one of the yokes being rotatably secured to each bushing and spanning one of the fingers, one of the pins being carried by each of the yokes and carrying one of the fingers, each pin defining the pivot axis of its associated finger.

9. The improvement claimed in claim 8 wherein:

a. the pivotal mounting of each finger to the clutch cover is radially inward of the pivotal mounting of each finger to the pressure plate; and b. the pivotal mounting of each finger to the clutch cover and the pressure plate is intermediate the pressure plate and the centrifugal weight.